United States Patent
Leung (10) Patent No.: US 6,879,581 B1
(45) Date of Patent: Apr. 12, 2005

(54) METHOD AND APPARATUS FOR PROVIDING REAL-TIME PACKETIZED VOICE AND DATA SERVICES OVER A WIRELESS COMMUNICATION NETWORK

(75) Inventor: Nikolai K. N. Leung, Takoma Park, MD (US)

(73) Assignee: Qualcomm Incorporated, San Diego, CA (US)

( * ) Notice: Subject to any disclaimer, the term of this patent is extended or adjusted under 35 U.S.C. 154(b) by 437 days.

(21) Appl. No.: 09/643,363

(22) Filed: Aug. 22, 2000

(51) Int. Cl.[7] .............................................. H04L 12/64
(52) U.S. Cl. .................... 370/352; 370/401; 370/466
(58) Field of Search ................................ 370/352, 401, 370/465, 466, 320, 335, 342, 400, 441, 469, 470, 474, 479

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,504,773 A | 4/1996 | Padovani et al. | |
| 5,781,547 A | 7/1998 | Wilson | 370/395 |
| 5,933,462 A | 8/1999 | Viterbi et al. | |
| 5,978,386 A * | 11/1999 | Hamalainen et al. | 370/466 |
| 6,160,804 A * | 12/2000 | Ahmed et al. | 370/349 |
| 6,230,012 B1 * | 5/2001 | Willkie et al. | 455/435 |
| 6,415,329 B1 * | 7/2002 | Gelman et al. | 709/245 |
| 6,463,074 B1 * | 10/2002 | Johnson et al. | 370/442 |
| 6,507,590 B1 * | 1/2003 | Terho et al. | 370/466 |
| 6,535,918 B1 * | 3/2003 | Bender et al. | 709/228 |
| 6,542,490 B1 * | 4/2003 | Ahmadvand et al. | 370/338 |
| 6,556,556 B1 * | 4/2003 | Sen et al. | 370/342 |

FOREIGN PATENT DOCUMENTS

| | | |
|---|---|---|
| WO | 9716007 | 5/1997 |
| WO | 9962223 | 12/1999 |

* cited by examiner

*Primary Examiner*—Chau Nguyen
*Assistant Examiner*—Duc Duong
(74) *Attorney, Agent, or Firm*—Philip Wadsworth; Thien R. Nguyen; Kyong H. Macek (57) ABSTRACT

A novel method and apparatus for transmitting voice traffic and data traffic over a circuit-switched network and a packet-switched network are presented. A new service option is introduced that allows a circuit-switched network to strip off IP/UDP/RTP header information from an internet protocol packet that may or may not be carrying multimedia payloads. Selectively eliminating the reliability measures in the RLP layer allows the circuit-switched network to reduce the delay associated with data traffic, and thus satisfy the more stringent delay requirements of voice traffic.

16 Claims, 6 Drawing Sheets

METHOD AND APPARATUS FOR PROVIDING REAL-TIME PACKETIZED VOICE AND DATA SERVICES OVER A WIRELESS COMMUNICATION NETWORK

BACKGROUND

I. Field of the Invention

The present invention relates to voice and data communication. More particularly, the present invention relates to a novel and improved method and apparatus for transmitting packetized voice traffic and data traffic over wireless communication networks.

II. Description of the Related Art

A modern day communication system is required to support a variety of applications. One such communication system is a code division multiple access (CDMA) system that conforms to the "TIA/EIA/IS-95 Mobile Station-Base Station Compatibility Standard for Dual-Mode Wideband Spread Spectrum Cellular System," hereinafter referred to as the IS-95 standard, or a CDMA system that conforms to the "TIA/EIA/IS-2000-2 Physical Layer Standard for cdma2000 Spread Spectrum Systems," hereinafter referred to as the IS-2000 standard. Another CDMA standard is the W-CDMA standard, as embodied in 3$^{rd}$ *Generation Partnership Project* "*3GPP*" Document Nos. 3G TS 25.211, 3G TS 25.212, 3G TS 25.213, and 3G TS 25.214. A CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein. Other examples of communication systems are time division multiple access (TDMA) systems and frequency division multiple access (FDMA) systems.

In this specification, base station refers to the hardware with which the remote stations communicate. Cell refers to the hardware or the geographic coverage area, depending on the context in which the term is used. A sector is a partition of a cell. Because a sector of a CDMA system has the attributes of a cell; the teachings described in terms of cells are readily extended to sectors.

In a CDMA system, communications between users are conducted through one or more base stations. A first user on one remote-station communicates to a second user on a second remote station by transmitting data on the reverse link to a base station. The base station receives-the-data and can route the data to another base station. The data is transmitted on the forward link of the same base station, or a second base station, to the second remote station. The forward link refers to transmission from the base station to a remote station and the reverse link refers to transmission from the remote station to a base station. In IS-95 and IS-2000 FDD mode systems, the forward link and the reverse link are allocated separate frequencies.

Given the growing demand for wireless data applications, the need for very efficient wireless data communication systems has become increasingly significant. The IS-95 and IS-2000 standards are capable of transmitting data traffic and voice traffic over the forward and reverse links. A method for transmitting data traffic in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein.

A significant difference between voice traffic services and data traffic services is the fact that the former imposes stringent maximum delay requirements. Typically, the overall one-way delay of speech traffic frames must be less than 100 msec. In contrast, the delay of data traffic frames can be permitted to vary in order to optimize the efficiency of the data communication system. Specifically, more efficient error correcting coding techniques, which require significantly larger delays than those that can be tolerated by voice traffic services, can be utilized. An exemplary efficient coding scheme for data is disclosed in U.S. Pat. No. 5,933,462, entitled "SOFT DECISION OUTPUT DECODER FOR DECODING CONVOLUTIONALLY ENCODED CODEWORDS," filed Nov. 6, 1996 and issued Aug. 3, 1999, assigned to the assignee of the present invention and incorporated by reference herein.

Another significant difference between voice traffic and data traffic is that the former requires a fixed and common grade of service (GOS) for all users. Typically, for digital systems providing voice traffic services, this translates into a fixed and equal transmission rate for all users and a maximum tolerable error rate for the speech traffic frames. In contrast, because of the availability of retransmission protocols for data traffic services, the GOS can be different from user to user and can be varied in order to increase the overall efficiency of the data communication system. The GOS of a data traffic communication system is typically defined as the total delay incurred in the transfer of a predetermined amount of data.

Yet another significant difference between voice traffic services and data traffic services is that the former requires a reliable communication link which, in the exemplary CDMA communication system, is provided by soft handoff. Soft handoff results in redundant transmissions from two or more base stations to improve reliability. However, this additional reliability is not required for data traffic transmission because the data packets received in error can be retransmitted. For data traffic services, the transmit power used to support soft handoff can be more efficiently used for transmitting additional data.

Various protocols exist for transmitting packetized traffic over packet-switching networks so that information arrives at its intended destination. One such protocol is "The Internet Protocol," RFC 791 (September, 1981). The internet protocol (IP) breaks up messages into packets, routes the packets from a sender to a destination, and reassembles the packets into the original messages at the destination. The IP protocol requires that each data packet begins with an IP header containing source and destination address fields that uniquely identifies host and destination computers. The transmission control protocol (TCP), promulgated in RFC 793 (September, 1981), is responsible for the reliable, in-order delivery of data from one application to another. The User Datagram Protocol (UDP) is a simpler protocol that is useful when the reliability mechanisms of TCP are not necessary. For voice traffic services over IP, the reliability mechanisms of TCP are not necessary because retransmission of voice packets is ineffective due to delay constraints. Hence, UDP is usually used to transmit voice traffic.

Additionally, since voice traffic is time-sensitive, another protocol for delivering time-sensitive traffic is required.

Real-time Transport Protocol (RTP), promulgated in RFC 1889, uses sequence information to determine the arrival order of packets and uses time-stamping information correct misalignments in the interarrival packet time, which is referred to as jitter. Jitter can be considered as the difference between the time when a packet is expected and the time when the packet actually arrives. An RTP header is used in conjunction with UDP and IP headers to provide voice traffic services over packet switching networks. The combined IP/UDP/RTP header is 40 bytes long, which is a significant percentage of the actual IP packet. In a slow communication link, the overhead required for transmitting IP/UDP/RTP headers may be unacceptable for end users.

SUMMARY

A novel and improved method and apparatus for providing real-time packetized voice and data services by compressing IP/UDP/RTP headers is presented, wherein the method comprises the steps of: receiving an internet protocol (IP) packet from the packet-switched network at a designated point in the circuit-switched network; generating a payload data packet; aligning the payload data packet to a circuit-switched frame; transporting the circuit-switched frame over-the-air to a wireless communication device; extracting the payload data packet from the circuit-switched frame at the wireless communication device; and generating a new IP packet from the payload data packet.

In one aspect of an embodiment, null frames are generated to replace corrupted IP packets and thus maintain synchronicity in the sequence flow.

In another aspect, the payload data packets are generated by stripping off all header information.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
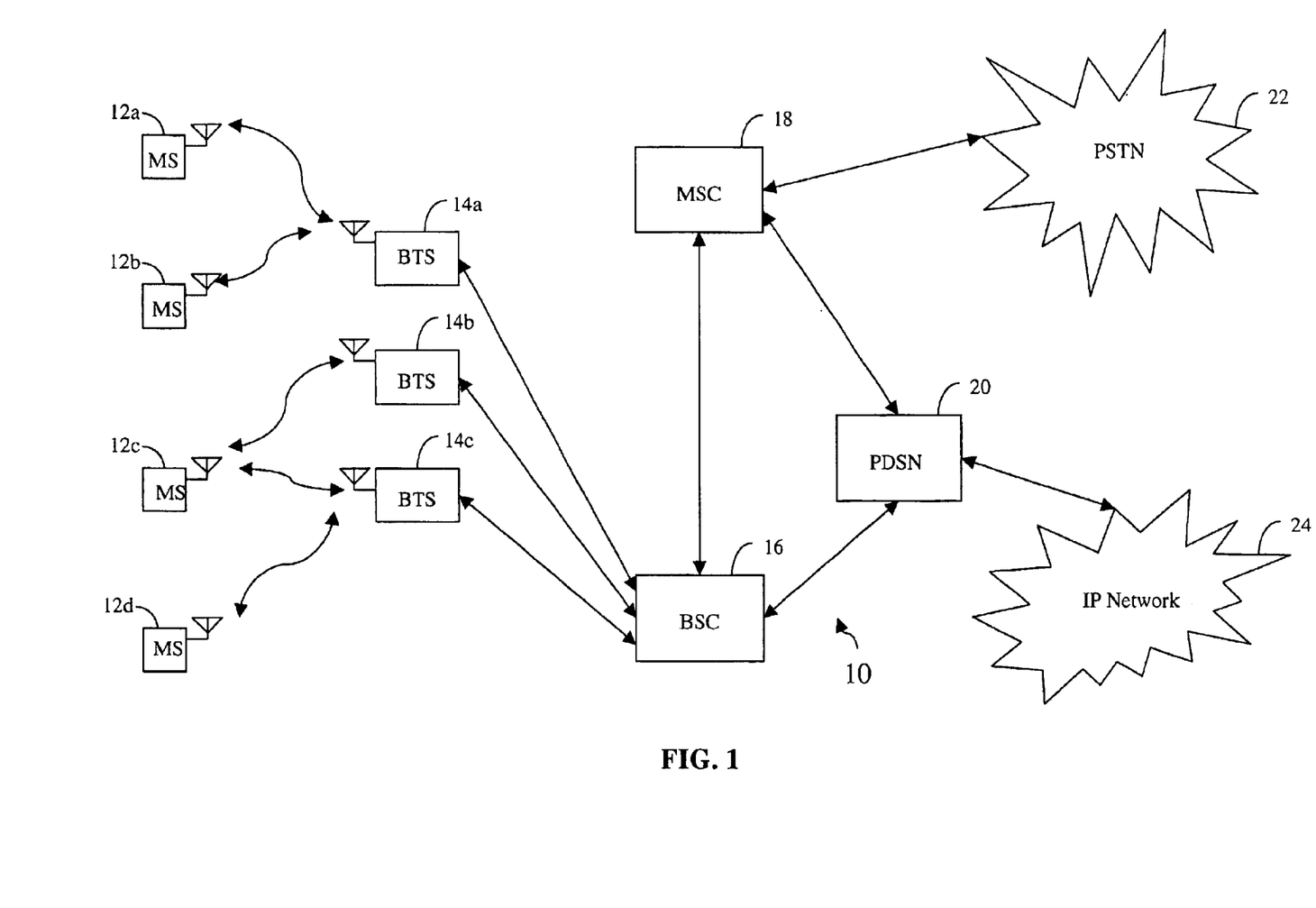
FIG. 1 is a diagram of an exemplary wireless communication system.

As illustrated in FIG. 1, a wireless communication network 10 generally includes a plurality of mobile stations (also called subscriber units or user equipment) 12a–12d, a plurality of base stations (also called base station transceivers (BTSs) or Node B). 14a–14c, a base station controller (BSC) (also called radio network controller or packet control function 16), a mobile station controller (MSC) or switch 24, a packet data serving node (PDSN) or internetworking function (IWF) 20, a public switched telephone network (PSTN) 22 (typically a telephone company), and an Internet Protocol (IP) network 18 (typically the Internet). For purposes of simplicity, four mobile stations 12a–12d, three base stations 14a–14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of wireless communication unit.

The mobile stations 12a–12d may advantageously be configured to perform one or more wireless packet data protocols such as described in, for example, the EIA/TIA/IS-707 standard. In a particular embodiment of the IS 707 standard, the mobile stations 12a–12d generate IP packets destined for the IP network 24 and encapsulate the IP packets into frames using a point-to-point protocol (PPP).

In one embodiment, the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20. In another embodiment, the mobile stations 12a–12d communicate with the base stations 14a–14c over an RF interface defined in the $3^{rd}$ Generation Partnership Project 2 "3GPP2", "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999), which is fully incorporated herein by reference. In another embodiment, the mobile stations 12a–12d communicate with the base stations 14a–14c over an RF interface defined in published TDMA, WCDMA, FDMA standards.

During typical operation of the wireless communication network 10, the base stations 14a–14c receive and demodulate sets of reverse link signals from various mobile stations 12a–12d engaged in telephone calls, Web browsing, or other data communications. Each reverse link signal received by a given base station 14a–14c is processed within that base station 14a–14c. Each base station 14a–14c may communicate with a plurality of mobile stations 12a–12d by modulating and transmitting sets of forward-link signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a–14c. For example, a mobile station 12c is communicating with two base stations 14b, 14c simultaneously. Eventually, when the mobile station 12c moves far enough away from the origination base stations 14c, the call will be handed off to the destination base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the IP packets to the PDSN 20, which will send the IP packets to the IP network 24. Alternatively, the BSC 16 will route the packets directly to the PDSN 20, which sends the packets to the IP network 24.

In a CDMA system, the forward link comprises at least one pilot channel and a plurality of traffic channels, wherein each channel is spread by an appropriate Walsh or quasi-orthogonal function. Each channel is then spread by a quadrature pair of pseudonoise (PN) sequences at a fixed chip rate of 1.2288 Mcps. The use of Walsh codes and PN sequences allows a base station to generate multiple forward link CDMA channels. In a multiple channel CDMA system, such as one described by the IS-2000 standard, the forward link channels can comprise multiple channels, including but not limited to, pilot channels, synchronization channels, paging channels, broadcast channels, assignment channels, common power control channels, common control channels, dedicated control channels, fundamental channels, supplemental channels, and supplemental code channels.

The reverse traffic channels can also comprise multiple channels, including but not limited to access channels, common control channels, fundamental channels, supplemental channels, and supplemental code channels, as specified by radio configurations of each individual subscriber network implementing IS-2000.

Each channel is physically constructed to achieve functionally different purposes. For example, a pilot channel may be simply spread using Walsh code "$W_0$" but a synchronization channel is an encoded, interleaved, spread, and modulated spread spectrum signal. The other forward and reverse link channels are also encoded, interleaved, spread, and modulated spread spectrum signals, but manipulated with various values to satisfy various requirements imposed by the appropriate telecommunication standard.

Figure 2:
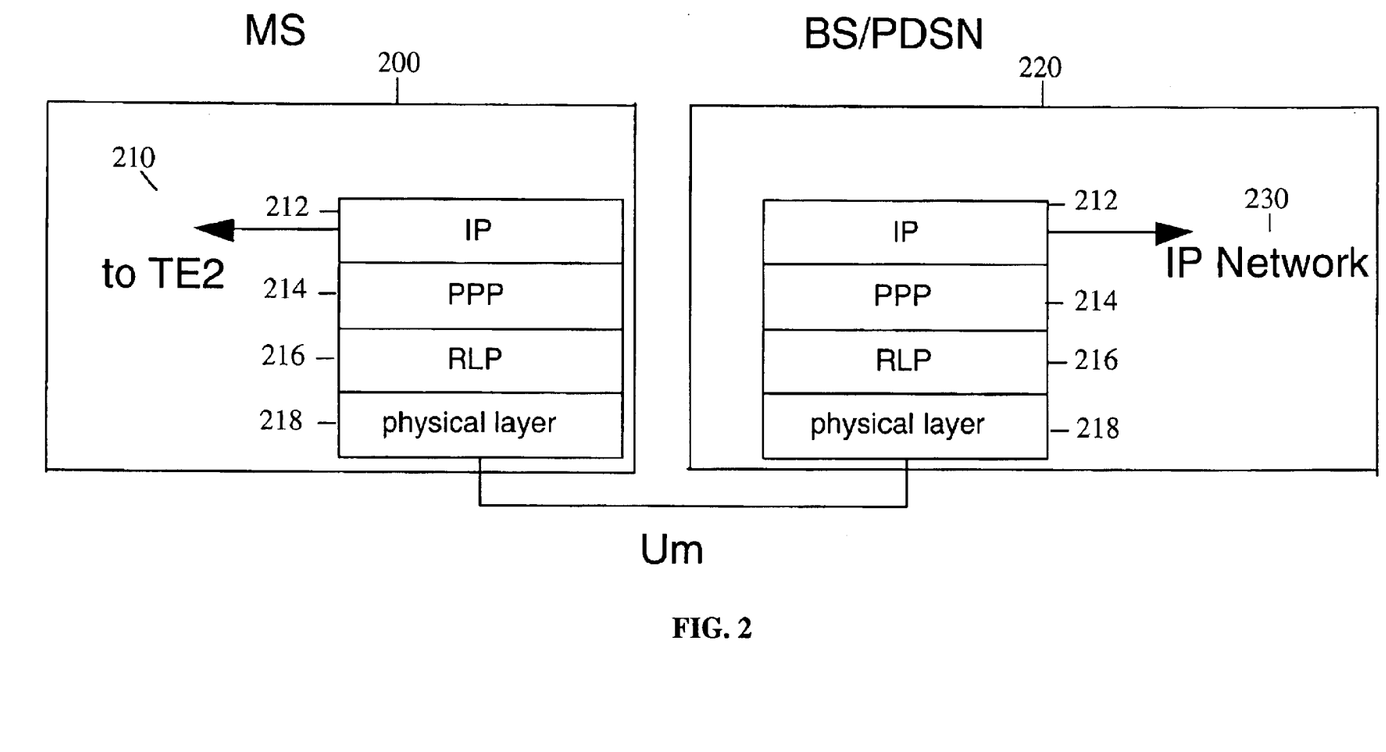
FIG. 2 is a diagram of a protocol stack for transmitting packet data over a wireless communication network.

The transmission of data packets from the IP network over a wireless communication network can be accomplished by adherence to a set of protocols, such as a protocol stack illustrated in FIG. 2. The transmission of data packets in accordance with the protocol stack of FIG. 2 will hereinafter be referred to as the Packet Data Service Option (PDSO). In FIG. 2, a wireless communication device 200 communicates with a base station(BS)/packet data serving node (PDSN) 220 through an interface Um. As discussed above, the wireless communication device 200 may be the origination or the destination of the IP packet, or alternatively, the wireless communication device 200 may be a transparent link to an electronic device 210. In either case, payload information is broken into packets wherein header information is added to each packet. The IP header 212 sits on top of the PPP layer 214, which sits on the RLP layer 216, which sits on top of the physical layer 218. The RLP layer 216 is the Radio Link Protocol layer, which is responsible for retransmitting packets when a transmission error occurs. The packets are transported over the air to a BS/PDSN 220, wherein the packet is sent over the IP network 230.

Header compression is often used in wireless communication systems to improve the bandwidth and power efficiency of the link by increasing the percentage of the link used for the information payload. Unfortunately, due to the nature of wireless communication systems, temporary interruptions in the delivery of information packets are not uncommon. The occurrence of any such interruption may cause significant delays due to the need to retransmit a resynchronization packet to resynchronize a header decompressor at a target device and a need to re-negotiate traffic parameters between the header compressor end and the header decompressor end. There is a present need to reduce the amount of delay caused by the transmission of header information, and to increase the data throughput rate of the system accordingly. The need to increase the data throughput rate is always present in modern communication systems that support a variety of applications.

In an exemplary embodiment, packetized data traffic and packetized voice traffic are transported over a wireless communication network by selectively bypassing the reliability measures within the RLP layer. The packetized data traffic and packetized voice traffic are encapsulated in payload data packets that are the same size as the data frames designed for conventional circuit-switched voice services. Hereinafter, the packetized data traffic and the packetized voice traffic will be referred to as IP packets. For example, in an IS-95 CDMA system, voice traffic is transmitted in vocoder-generated 20 ms data frames. In an IS-2000 system, voice traffic is transmitted in data frames of 5 ms, 20 ms, 40 ms, or 80 ms duration. Hence, the IP packets in the exemplary embodiment are carried in payload data packets that are aligned to the data frames of the wireless communication system. Alignment of the IP packets to the data frames of the wireless communication system is advantageous since the wireless communications system is already designed to implement capacity-efficient framing of speech.

In order to accomplish the alignment of payload data packets with the vocoder frames of the wireless communication system, the IP/UDP/RTP headers of the IP packet frames are compressed. In one exemplary embodiment, compression takes the form of stripping IP/UDP/RTP headers from the IP packets so that the vocoder frames carry payload data packets that are aligned with the vocoder frames. Upon receipt, new headers are generated and appended to the payload by the wireless communication device.

The purpose of the IP/UDP/RTP protocols is to ensure a reliable delivery of packets between an origination point and a destination. However, in a communication session wherein voice or video services is transported over a packet-switched network and a circuit-switched network, the exemplary embodiment deliberately omits the reliability protections resulting from these protocols in order to implement an error recovery technique in a wireless communication system. In one aspect of the embodiment, IP packets are aligned within vocoder data frames and are transported over the air to a receiving end. If a packet is lost from the IP network, a null frame can be generated to replace the lost packet. A null frame is a specially coded frame that identifies to the wireless communication device that the original frame from the IP network was lost. Receipt of a null frame initiates error recovery techniques such as the repetition of previous non-null frames or the interpolation of data from adjacent frames. The use of error recovery techniques reduces the time delay of sending requests for the retransmission of lost frames and the actual retransmission of the lost frames. In addition, the use of null frames allows the decoder at a receiving end to maintain synchronicity with the encoder at the transmitting end because the null frames are sent with the RTP sequence numbers associated with the corrupted IP packets.

Figure 3:
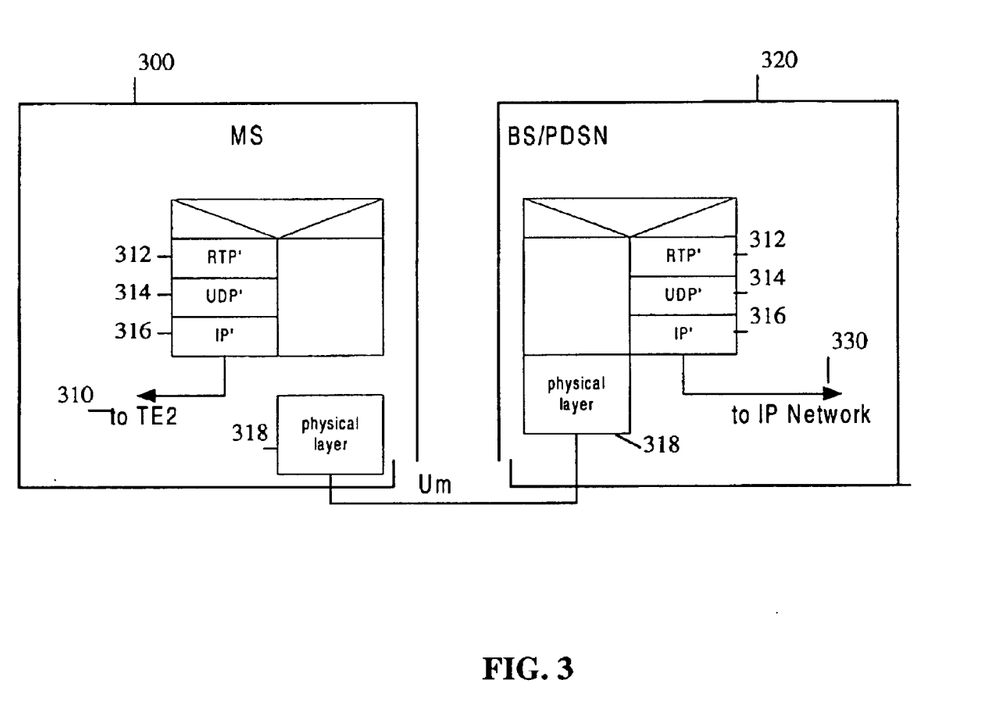
FIG. 3 is a diagram of a protocol stack for transmitting real-time packet data services over a wireless communication network.

FIG. 3 illustrates the protocol stack of the exemplary embodiment described above, which will hereinafter be referred to as the Real-Time Packet Data Service Option (RTPDSO). FIG. 3 shows an electronic device 310 linked to a wireless communication device 300 which is then linked to an IP network 330 via a BS/PDSN 320. The protocols shown in FIG. 3 such as IP' 312, UDP' 314, and RTP' 316, represent the function of removing and re-inserting the IP/UDP/RTP headers, i.e., the header compression. Since the destination and source IP addresses and port numbers do not change, the only dynamic information during normal operation is the RTP sequence numbers.

It should be noted that the implementation of the exemplary embodiment selectively depends upon the nature of the wireless communication device. For example, if the wireless communication device serves as the target destination of the IP data packet, then the vocoder that encodes and decodes the IP packets is located on the wireless communication device and the wireless communication device need not reconstruct the IP/UDP/RTP headers locally. However, the wireless communication device can also serve as the transparent medium for the transport of IP packets to another electronic device, such as a laptop or a PDA. Hence, IP packets received by the wireless communication device from the electronic device must be stripped of IP/UDP/RTP headers before transmission over the wireless network, and payload packets received from the wireless network must be reconstructed with new IP/UDP/RTP headers before transmission to the electronic device.

In an alternative embodiment, the RTPDSO and PDSO are implemented together so that initialization, negotiation, and compression update information are more reliably transmitted using the RLP layer. However, the payload data is not transported using the RLP layer.

Figure 4:
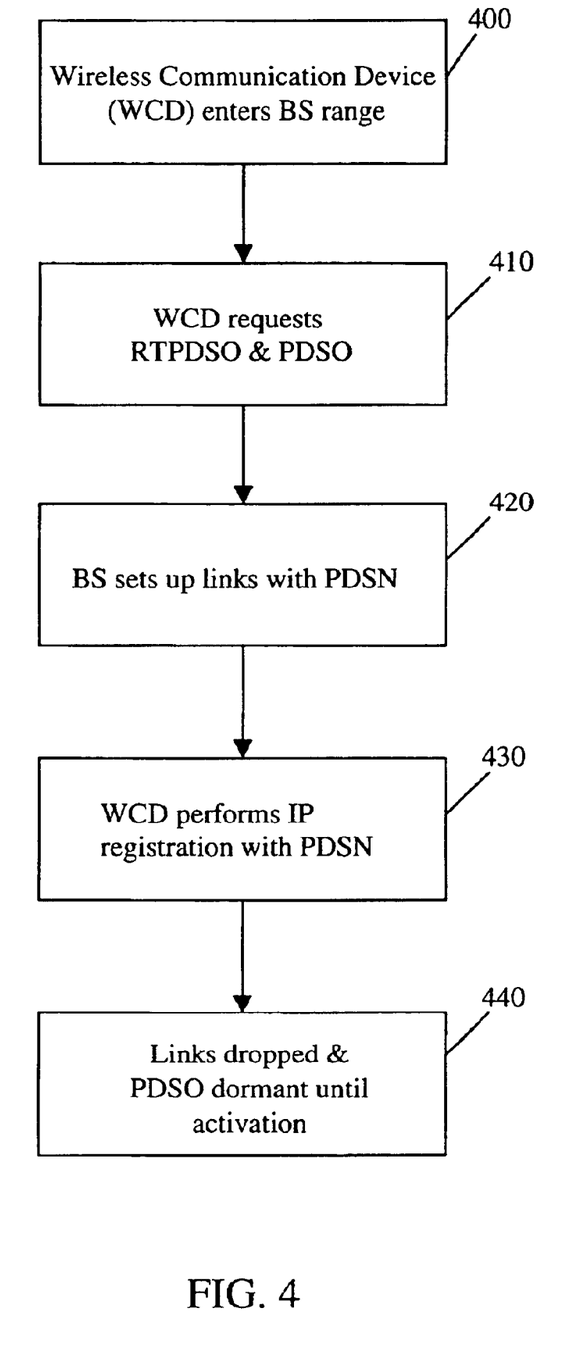
FIG. 4 is a flowchart of an initialization process for a mobile station entering the range of a PDSN.

FIG. 4 is a flowchart of an initialization and registration process for a wireless communication device entering the range of a PDSN that provides both service options, PDSO and RTPDSO. At step 400, the wireless communication device enters the range of a base station that is connected to a PDSN. At step 410, the wireless communication device requests the base station for RTPDSO and the PDSO support for packetized transmissions over the PDSN. At step 420, the base station sets up two air interface links with the PDSN for these two service options. It should be noted that the number of air interface links implemented for this embodiment is dependent upon system conditions. At step 430, the wireless communication device originates a call with the PDSO in order to perform mobile IP registration. Various mobile IP registration and session initiation protocols (SIP) exist that can be used with the embodiments described below, but will not be described herein. At step 440, the air interface links can be dropped and the PDSO goes dormant.

Upon the transmission of a IP packet in either the forward or reverse link, a set up process first takes place to establish protocols and exchange compression parameters. Compression parameters may include, but are not limited, to the RTP sequence number, IP addresses, and UDP port numbers. In one embodiment, the set up process takes place using the PDSO to ensure the reliability of the air interface link.

In an embodiment wherein the wireless communication device is the target destination of the IP packet, the wireless communication device performs all protocol negotiation over the PDSO.

In an embodiment wherein the wireless communication device is the transparent medium for the transport of IP packets to a connected electronic device, then the electronic device performs protocol negotiation over the PDSO. However, the wireless communication device strips the header information from the IP packets destined for transport over the PDSN and reconstructs header information for the payload data packets destined for the electronic device. Information as to the compression negotiation (header extraction and reconstruction) originates at the wireless communication device and is carried over the PDSO.

Figure 5:
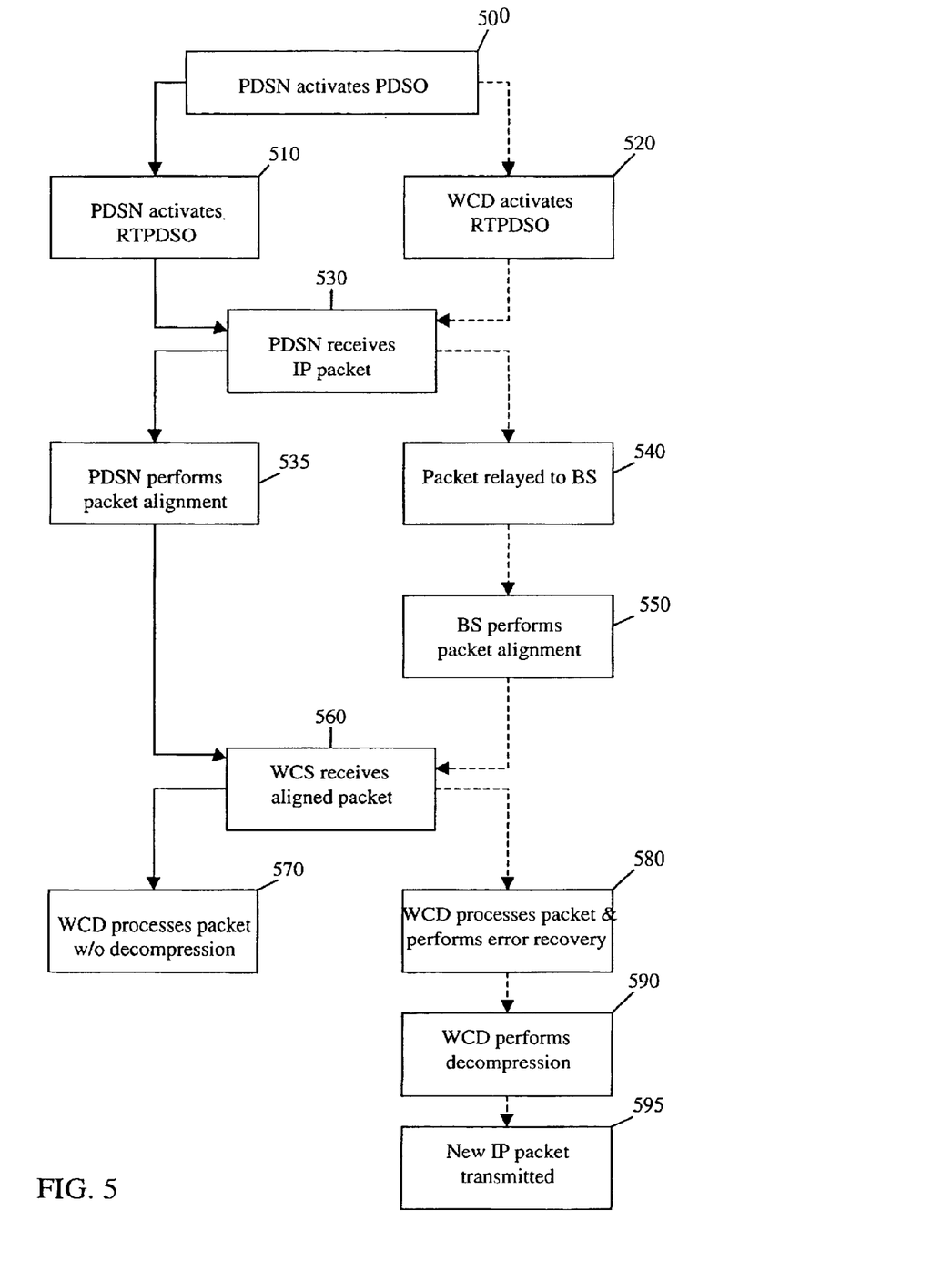
FIG. 5 is a flowchart of a forward link transmission of real-time packet data services.

FIG. 5 is a flowchart of a forward link transmission of real-time packet data services. At step 500, the PDSN re-activates the PDSO to start the initialization of the mobile-terminated real-time packet data call. At step 510, the PDSN activates the RTPDSO for transporting voice, video service or other multimedia packets to the wireless communication device. Alternatively, the wireless communication device can activate the RTPDSO for transporting voice or video service packets.

At step 530, the PDSN receives IP packets from the IP network. At step 535, the PDSN aligns the packets to vocoder data frames through compression and transports the voice or video packets to the base station. It should be noted that not aligning the payload with the air interface frames will require extra overhead to delineate frames of the payload. Non-alignment of packets to frames can also introduce additional latency due to the wait for more data to fill air interface frames. While receiving packets from the IP network and conveying the IP packets to the base station, the PDSN keeps track of RTP sequence numbers. To reduce jitter and account for transmission delays, the PDSN performs de-jitter buffering. If the processing element detects missing frames, then the processing element generates low-rate null frames. An exemplary low-rate is one-eighth rate for CDMA voice application as described in the aforementioned U.S. Pat. No. 5,504,773. Null frames are specially coded frames that identify to the wireless communication device that the original frame from the IP network was lost. The use of null frames allows the decoder in the wireless communication device to remain synchronized with the encoder in the IP network.

In an alternative step of the embodiment, at step 540, the PDSN relays the packets from the IP network directly to the base station without performing compression. At step 550, the base station performs compression by stripping off header information from the IP packet to form a payload data packet that is sent over the air interface to the wireless communication device. In this alternative embodiment, the base station would perform the necessary de-jitter buffering and the transmission of null frames over the air interface when packets from the IP network are lost.

At step 560, the wireless communication device receives data frames over the air and decodes all data frames. At step 570, if the wireless communication device is the targeted destination of the payload data packets, then the decoder of the wireless communication device processes the IP packets without adding header information to the payload data packets. For received null frames, the decoder performs error recovery techniques such as repeating the previous non-null frame or interpolating data from adjacent frames. For frames that are received in error, such as the case when cyclic redundancy code check bits are corrupted due to air interface performance, the decoder can perform the same error recovery techniques used for null frames.

Alternatively, at step 580, if the wireless communication device is the transparent medium to another electronic device, then the wireless communication device receives payload data packets over the air from the base station and performs error recovery on null frames or corrupted frames. At step 590, the wireless communication device encapsulates the payload in new packets with necessary IP/UDP/RTP headers. The RTP sequence number is incremented for every frame received, any necessary UDP and IP checksums are recomputed, and any static header information are all included in the header. At step 595, the new IP/UDP/RTP packets are transmitted to the targeted electronic device.

Figure 6:
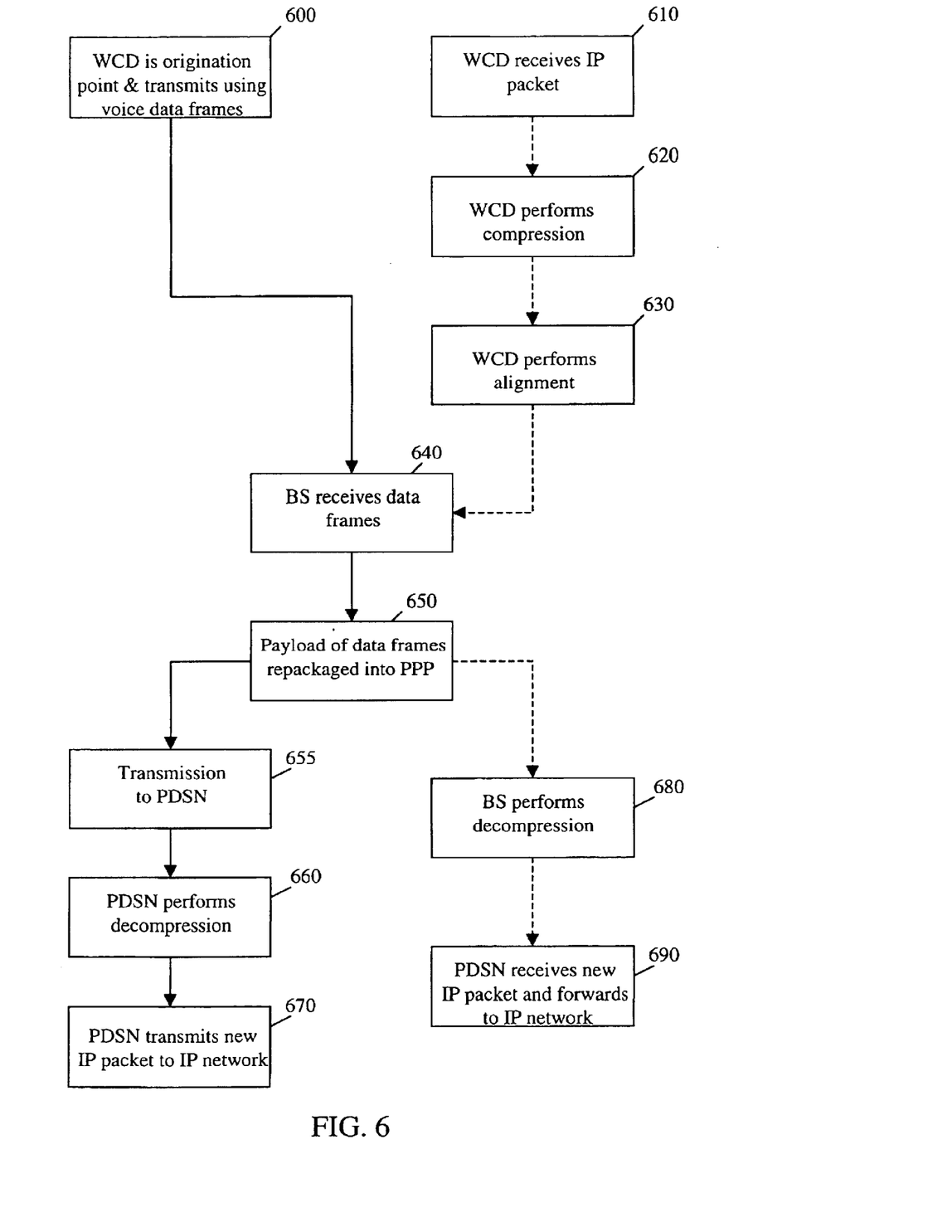
FIG. 6 is a flowchart of a reverse link transmission of real-time packet data services.

FIG. 6 is a flowchart of a reverse link transmission of real-time packet data services. At step 600, if the wireless communication device is the originator of the real-time packet data, the encoder of the wireless communication device generates data packets that are immediately sent over the RTPDSO using the same framing as a circuit-switched call. Alternatively, at step 610, if the wireless communication device is the transparent connection between an electronic device and the IF network, then the wireless communication device receives IP packets carrying header information from the electronic device. At step 620, the wireless communication device compresses the IP packets. As discussed previously in the exemplary embodiment, compression takes the form of stripping all header information from the IP packets. At step 630, the wireless communication device packages the compressed IP packets into payload data packets by framing the payload data packets in the same manner as the frames for circuit-switched voice services. The aligned payload data packets are transported over the air to a base station.

At step 640, the base station receives data frames carrying the aligned payload data packets from the air interface. At step 650, the base station repackages the payload data packets into PPP packets for delivery to a PDSN. If the base station receives null frames or corrupted frames from the wireless communication device, the decoder located at the base station performs error recovery techniques, such as the substitution of a null frame with the last non-null frame or the reconstruction of data from interpolating adjacent data frames.

At step 660, the PDSN receives the repackaged frames from the base station and "decompresses" the payload by reinserting the necessary IP/UDP/RTP headers. For each frame, RTP sequence numbers are incremented, UDP and IP checksums are computed, and all the static header information is re-inserted into the reconstructed header. At step 670, the new IP/UDP/RTP packet is transmitted to the IP network.

Alternative to step 655, at step 680, the base station performs the reinsertion of the necessary IP/UDP/RTP headers before delivering the frames to the PDSN. At step 690, the PDSN relays the new IP/UDP/RTP packets to the IP network.

Thus, a novel and improved method and apparatus for transporting voice and video services over an IP network have been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the processing elements and various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, micro-controller, or state machine. The software module could reside in RAM memory, flash memory, ROM memory, EPROM memory, EEPROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

I claim:

1. A method for transporting real-time data over a packet-switched network and a circuit-switched network, comprising the steps of:

receiving an internet protocol (IP) packet from the packet-switched network at a designated point in the circuit-switched network;

generating a payload data packet;

aligning the payload data packet to a circuit-switched frame;

transporting the circuit-switched frame over-the-air to a wireless communication device;

extracting the payload data packet from the circuit-switched frame at the wireless communication device; and generating a new IP packet from the payload data packet.

2. A method for transporting real-time data over a packet-switched network and a circuit-switched network, comprising the steps of:

receiving an internet protocol (IP) packet from the packet-switched network at a designated point in the circuit-switched network;

generating a payload data packet, wherein the step of generating the payload data packet comprises the steps of:

if the data in the internet protocol packet is intact, then compressing the internet protocol packet at the designated point to form a payload data packet; and if the data in the internet protocol packet is corrupted, then generating a null frame as a payload data packet;

aligning the payload data packet to a circuit-switched frame;

transporting the circuit-switched frame over-the-air to a wireless communication device;

extracting the payload data packet from the circuit-switched frame at the wireless communication device; and generating a new IP packet from the payload data packet.

3. The method of claim 2, wherein the step of compressing the IP packet comprises the step of stripping off header information.

4. The method of claim 2, wherein if the null frame is the payload data packet, then the step of extracting the payload data packet comprises the step of interpolating a substitute for the null frame from at least one adjacent payload data packet.

5. The method of claim 2, wherein if the null frame is the payload data packet, then the step of extracting the payload data packet comprises the step of using a last non-null frame as the payload data packet.

6. The method of claim 3, wherein the step of generating the new IP packet from the payload data packet comprises the step of adding new header information to the payload data packet.

7. The method of claim 6, wherein if the null frame is received, the step of generating the new IP packet from the payload data packet further comprises the steps of:

incrementing a radio transport protocol (RTP) sequence number if the null frame is received; and including the incremented RTP sequence number in the new header information.

8. The method of claim 2, wherein a packet data serving node (PDSN) is the designated point, and the step of generating the payload packet is performed by the PDSN.

9. The method of claim 2, wherein the step of generating the payload data packet is performed by a base station.

10. A method for transporting real-time data over a circuit-switched network and a packet-switched network, comprising the steps of:

receiving an internet protocol (IP) packet from an electronic device at a wireless communication device;

generating a payload data packet from the IP packet at the wireless communication device;

aligning the payload data packet to a circuit-switched frame;

transporting the circuit-switched frame over-the-air to a base station;

extracting the payload data packet from the circuit-switched frame; and generating a new IP packet from the payload data packet.

11. The method of claim 10, wherein the step of generating the new IP packet from the payload data packet is performed by the base station.

12. The method of claim 10, wherein the step of generating the new IP packet from the payload data packet is performed by a packet data serving node (PDSN).

13. A base station for transporting packetized voice traffic and packetized data traffic over a wireless communication network, comprising:

a processor; and a storage element coupled to the processor comprising an instruction set executable by the processor, wherein the instruction set comprise instructions for:

receiving an internet protocol (IP) packet;

compressing the IP packet to form a payload data packet;

aligning the payload data packet to a voice frame; and transmitting the aligned voice frame to a wireless communication device wherein the instructions are further for generating a null frame if the received IP packet is corrupt, wherein the null frame will carry the same Radio Transport Protocol (RTP) sequence number as the flawed IP packet and will be the payload data packet.

14. A packet data serving node (PDSN) for transporting of packetized voice traffic and packetized data traffic over a wireless communication network, comprising:

a processor; and a storage element couple to the processor comprising an instruction set executable by the processor, wherein the instruction set comprise instructions for:

receiving an internet protocol (IP) packet;

compressing the IP packet to form a payload data packet;

aligning the payload data packet to a voice frame; and transmitting the aligned voice frame to a base station wherein the instructions are further for generating a null frame if the received IP packet is corrupted, wherein the null frame will carry the same Radio Transport Protocol (RTP) sequence number as the flawed IP packet and will be the payload data packet.

15. Apparatus for transporting real-time data over a packet-switched network and a circuit-switched network, comprising:

means for receiving an internet protocol (IP) packet from the packet-switched network at a designated point in the circuit-switched network;

means for generating a payload data packet;

means for aligning the payload data packet to a circuit-switched frame;

means for transporting the circuit-switched frame over-the-air to a wireless communication device;

means for extracting the payload data packet from the circuit-switched frame at the wireless communication device; and means for generating a new IP packet from the payload data packet.

16. Apparatus for transporting real-time data over a circuit-switched network and a packet-switched network, comprising:

means for receiving an internet protocol (IP) packet from an electronic device at a wireless communication device;

means for generating a payload data packet from the IP packet at the wireless communication device;

means for aligning the payload data packet to a circuit-switched frame;

means for transporting the circuit-switched frame over-the-air to a base station;

means for extracting the payload data packet from the circuit-switched frame; and means for generating a new IP packet from the payload data packet.

* * * * *